(No Model.)
E. E. MUELLER.
COFFEE ROASTER.
No. 342,834. Patented June 1, 1886.
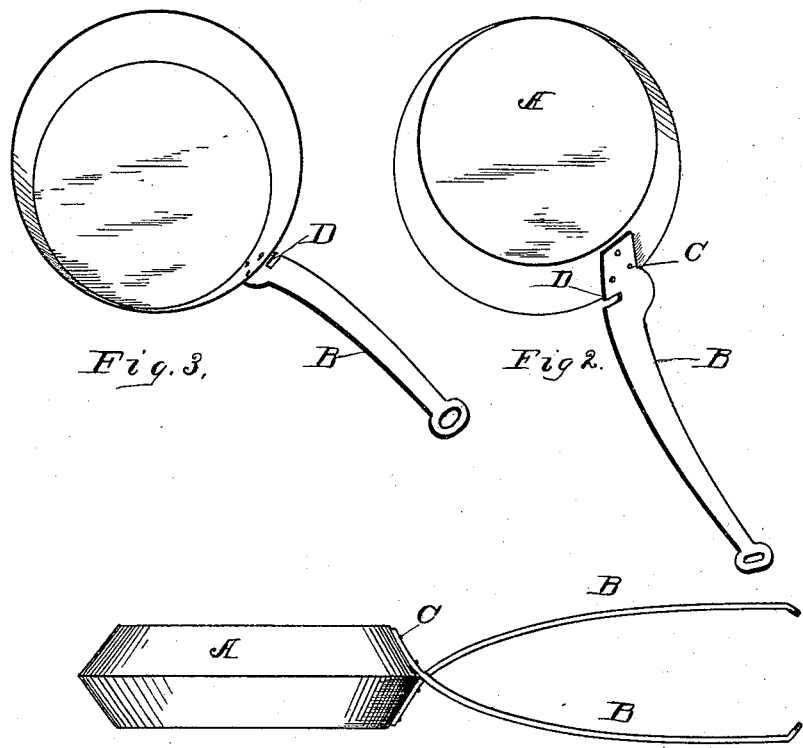
Witnesses:
Robert Kirk
Jacob Forlow
Inventor:
Erich E. Mueller
By J. S. Zerbe
Attorney.

UNITED STATES PATENT OFFICE.

ERICH E. MUELLER, OF ST. LOUIS, MISSOURI.

COFFEE-ROASTER.

SPECIFICATION forming part of Letters Patent No. 342,834, dated June 1, 1886.

Application filed June 22, 1885. Serial No. 169,413. (No model.)

*To all whom it may concern:*

Be it known that I, ERICH E. MUELLER, of St. Louis, in the county of St. Louis and State of Missouri, have invented a new and useful Improvement in Coffee-Roasters, which improvement is fully set forth in the following specification and accompanying drawings, in which—

Figure 1 is a side view of my improved coffee-roaster, and Figs. 2 and 3 perspective views of the parts detached.

The present invention relates to an improvement in the class of articles known as "coffee-roasters," wherein I provide a pair of skillets or pans provided with suitable handles, the base of each handle provided with a slot so that when the pans are placed with their inner sides together each slot will receive a portion of the handle of the opposite pan, and thus form a kind of detachable hinge. This permits of the roaster being easily manipulated in emptying and refilling, all of which will now be set forth in detail.

In the accompanying drawings, A represents a pair of skillets or pans, formed of sheet metal preferably, as in the usual manner, of the same size and configuration, except that the rim of the one is slightly larger than the other, so as to receive therein the edge of the opposite pan when they are placed with their inner sides together, as shown in Fig. 1. These pans A are provided with suitable metallic handles, B, secured thereto by the usual rivets, C, or in any suitable manner, as found convenient. The base of these handles adjoining the pans A are somewhat enlarged laterally, and provided at one side with a slot, D, at right angles with the general direction of the handle. These slots and handles are all formed over the same pattern and not in pairs, so that when the pans A are placed with their inner sides together, as shown in Fig. 1, the recess D of each handle will receive therein the part of the handle opposite to the slot D, as shown, and thus when the pans are placed together the one within the rim of the other and the handles in position the said slots within the handles receiving the opposite handle will act as a hinge, so that the pans may be opened and closed to receive and deposit their contents, or the pair can be removed one from the other by simply turning the handle of the one slightly sidewise, and thus disengaging the handles and slots from each other.

As will be noticed, this device may be used for a great variety of purposes in cooking. The outer ends of the handles of the pans by being pressed together will cause the edges of the pans to fit closely together, and thus prevent the escape of the aroma from the coffee or it may prevent the escape of the steam and moisture from the pans in cases where the said pans are used for other culinary purposes.

What I claim as new is—

The combination of a pair of pans, the edge of one resting within the top of the other, each pan formed with a handle having a transverse slot near the base of said handle, which engages with the slot of the opposite handle, thus forming a detachable hinge, substantially as herein set forth and described.

In testimony that I claim the foregoing I have hereunto set my hand, this 18th day of May, 1885, in the presence of witnesses.

ERICH E. MUELLER.

Witnesses:
J. RAMMING,
THEO. H. WUNUP.